Dec. 11, 1956  J. D' A. CLARK  2,773,789
CROSSCUT FIBER AND METHOD FOR ITS PREPARATION
Filed March 23, 1953  3 Sheets-Sheet 3

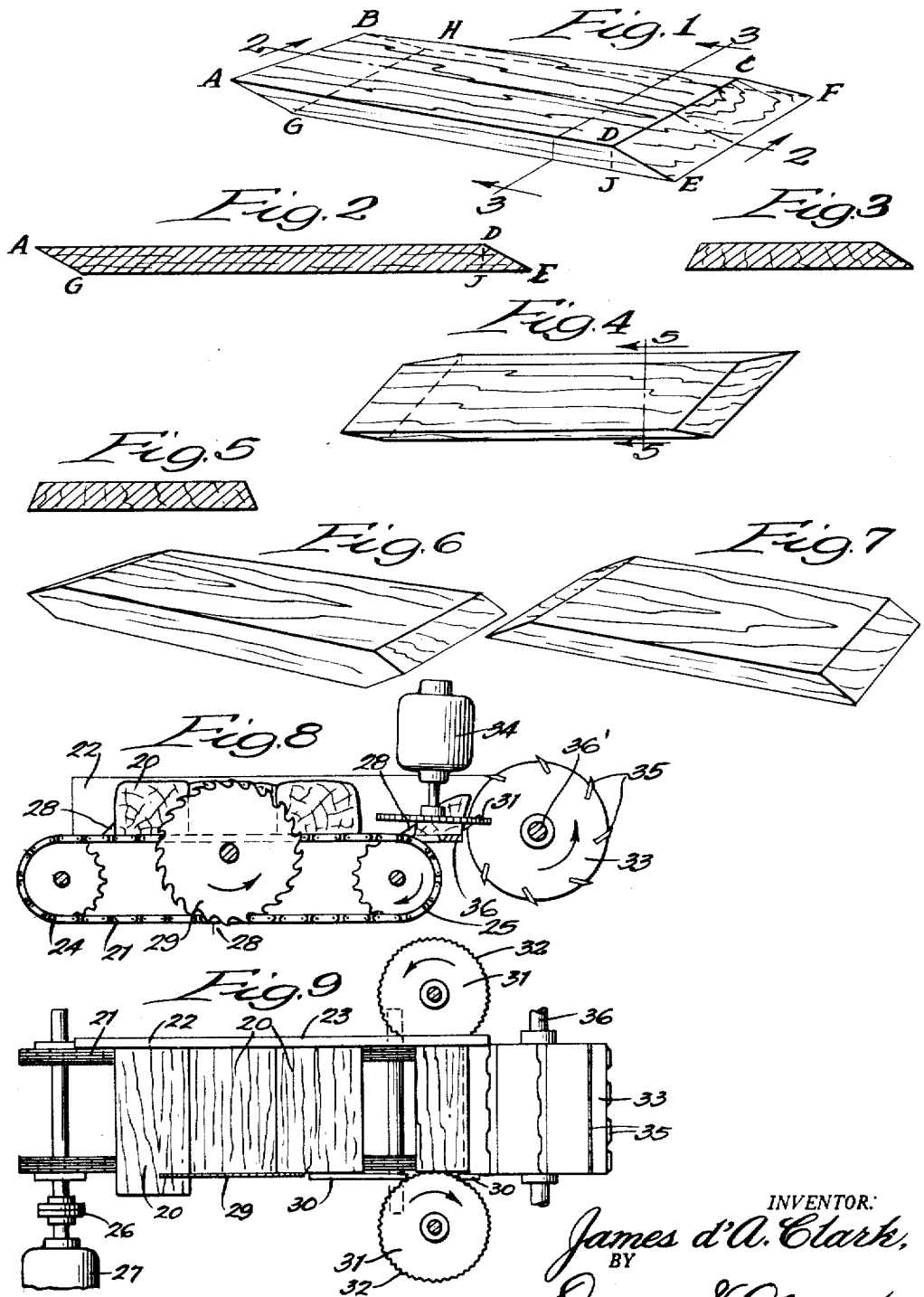
Dec. 11, 1956  J. D' A. CLARK  2,773,789
CROSSCUT FIBER AND METHOD FOR ITS PREPARATION
Filed March 23, 1953  3 Sheets-Sheet 1
INVENTOR.
James d'A. Clark
BY
Dawson & Ooms
ATTORNEYS.

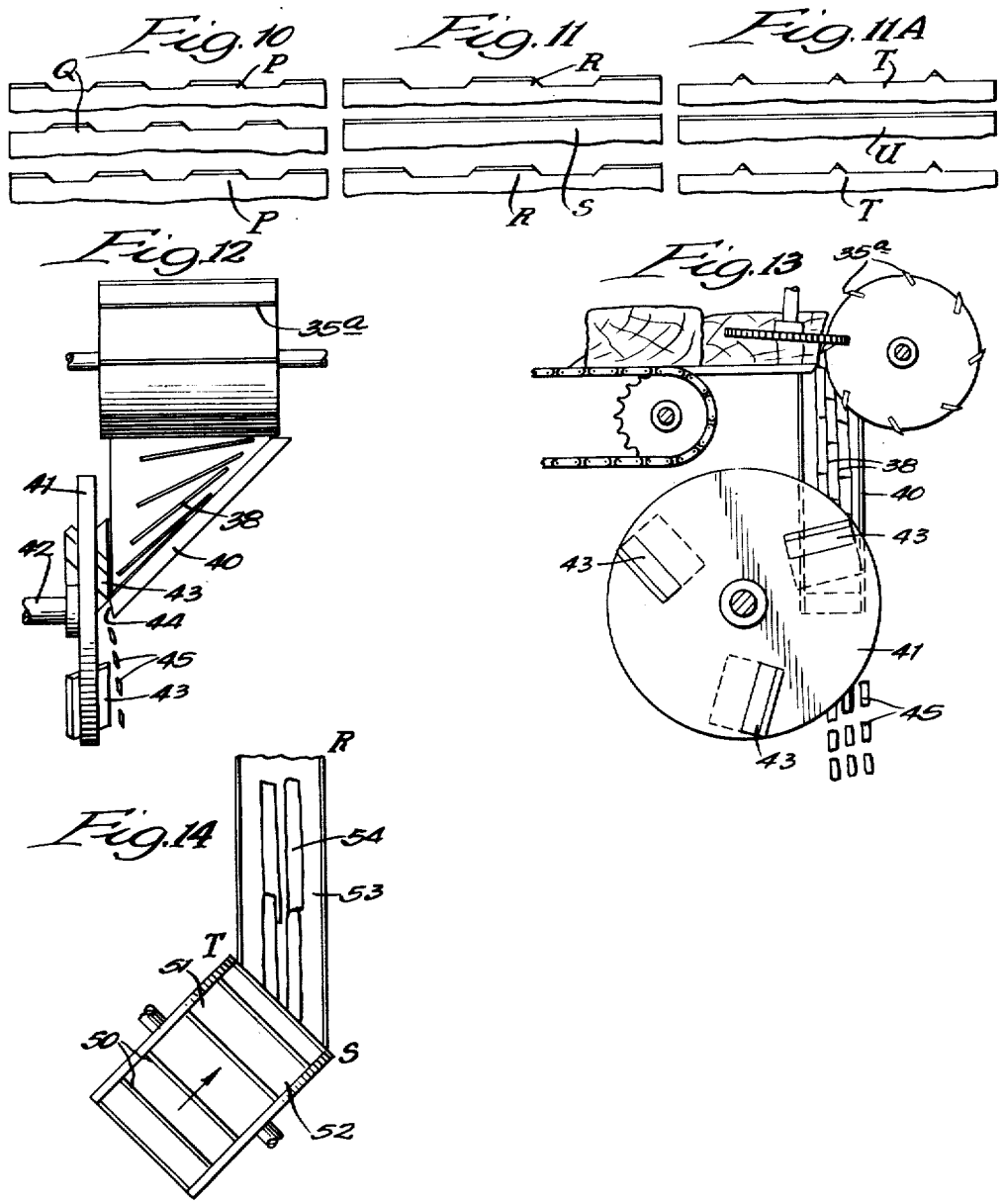

INVENTOR:
James d'A. Clark,
BY
Dawson & Ormes,
ATTORNEYS.

United States Patent Office 2,773,789
Patented Dec. 11, 1956

2,773,789
CROSSCUT FIBER AND METHOD FOR ITS PREPARATION

James D'A. Clark, Longview, Wash., assignor to Changewood Corporation, Chicago, Ill., a corporation of Illinois Application March 23, 1953, Serial No. 344,089

12 Claims. (Cl. 154—45.9)

This invention relates to a new and improved wood particle and it relates particularly to a woody fibrous element and method for manufacturing same, and to a consolidated product manufactured therefrom and method for manufacturing same.

This is a continuation in part of my copending application Ser. No. 192,284 filed October 26, 1950 and entitled Crosscut Fiber and Method for Its Preparation, now abandoned.

In my copending application, Serial No. 94,812, filed May 23, 1949 and issued as U. S. Patent No. 2,689,092, description is made of the manufacture of a fiber flake or wafer cut crosswise tangentially to the grain of the wood and having end faces formed at right angles to the sides and to the top and bottom faces of the wafer. Unless such flakes or wafers are cut undesirably thin, the abrupt vertical end faces of the wafers cause undesirable zones or lines of weakness throughout the structure molded therefrom. This is particularly evident with harder woods and woods having hard summer wood annual rings, such as are found in southern pines. Moreover, on the broad faces of well compacted structures molded therefrom and particularly where the end of one wafer overlaps the face of another, there exists an undesirable linear depression which not only constitutes a line of weakness upon flexure but presents an unattractive appearance and provides a crevice wherein dirt may lodge. The side portions of flakes of this type do not present the same difficulties because the side surfaces are predominantly parallel to the annual rings which are usually at an acute angle to the broad surfaces. Further, by being parallel to the grain, the side faces and edges are more pliable laterally than are the end faces and edges. Consequently the juncture between the side edges and the underlying element does not become obvious nor objectionable in the molded structure.

An object of this invention is to provide an improved wood fiber or flake suitable for manufacturing molded fibrous products.

Another object is to provide fibers or flakes of woody material characterized by their ability to form a smooth, continuous unbroken surface and which become well joined with underlying fibrous elements during molding into a consolidated product.

A further object is to provide a method for producing wafers suitable for forming into strong and attractive consolidated products by the use of brittle woody material, such as kiln dried lumber.

Another object is to provide a method of producing woody flakes or wafers of predetermined thickness and length with ends of the flakes tapered or wedge shaped.

A still further object is to produce a strong consolidated fibrous product of high density having a substantially unbroken surface by the use of woody flakes or wafers advantageously shaped and thinly coated with resinous material.

These and other objects and advantages of this invention will hereinafter appear adn for purposes of illustration, but not of limitation, an embodiment of the invention is shown in the accompanying drawings in which—

Figure 1 is a perspective view of a woody flake produced in accordance with this invention;

Figure 2 is a sectional view taken along the line 2—2 of Figure 1;

Figure 3 is a sectional view taken along the line 3—3 of Figure 1;

Figure 4 is a plan view of a modified form of flake produced in accordance with this invention;

Figure 5 is a sectional view taken along the line 5—5 of Figure 4;

Figure 6 is a perspective view of a further modification in a woody wafer or flake embodying features of this invention;

Figure 7 is a perspective view showing a still further modification in a flake or wafer embodying features of this invention;

Figure 8 is a schematic side elevational view of an apparatus which may be used in preparing flakes in accordance with this invention;

Figure 9 is a plan view of the apparatus shown in Figure 8;

Figure 10 shows a grouping of knife elements which may be used in the manufacture of wafers of the type shown in Figure 6;

Figure 15:
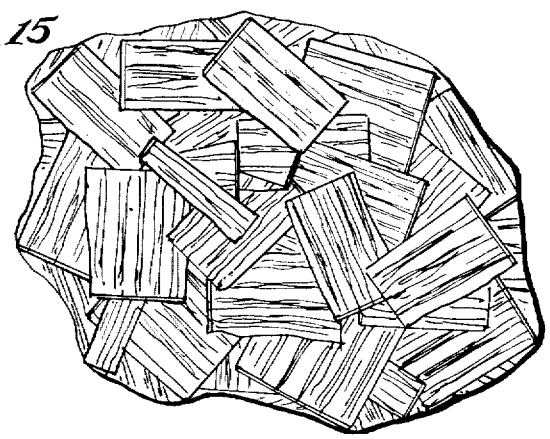
Figure 16:
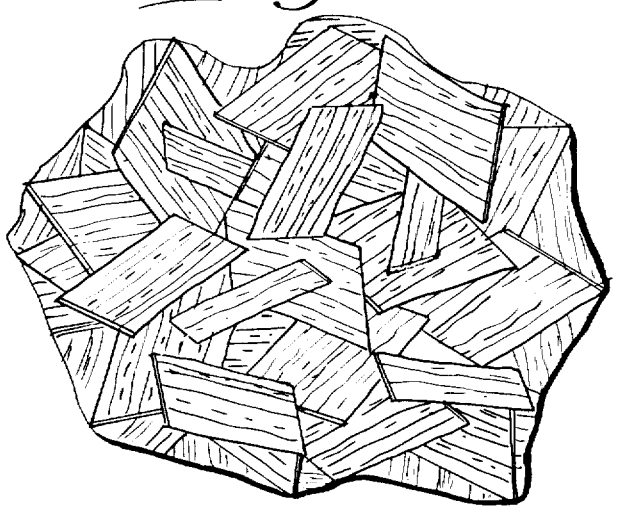

Figure 11 indicates a grouping of knife elements adapted to manufacture flakes of the type shown in Figure 7;

Figure 11A shows another grouping of knife elements which may also be used to manufacture flakes of the type shown in Figure 7;

Figure 12 is an elevational view showing a modification in the apparatus of Figure 8 which may be used in the manufacture of flakes in accordance with this invention;

Figure 13 is an end view of the elements shown in Figure 12;

Figure 14 is an elevational view of a further modification which may be embodied in the apparatus shown in Figure 8;

Figure 15 is a fragmentary view of the surface of a composite fibrous structure, made of wafers having their end edges perpendicular to the sides, and Figure 16 is a fragmentary view of a composite fibrous structure made with wafers having end edges at an oblique angle with the sides.

In accordance with this invention, wafers or flakes are cut from a wooden block by cutting into the block of wood parallel to the length of the fibers in the wood with a cutting movement transverse said length to form wafers having a thickness corresponding to the depth of cut and by scoring the wood with angular cuts in the direction of cutting movement. For this purpose, wafers or flakes are cut from a wooden block positioned with a substantially flattened side lying in the path of cutting elements and with the fibers extending crosswise thereof by knife elements which are arranged substantially parallel to the length of the fibers during cutting operations to form the broad faces while the end faces are severed at acute angles with the broad faces to impart the desired taper and flexibility to the ends for the purpose of enabling the manufacture of a strong, smooth-faced consolidated product.

As shown in Figures 8 and 9, a succession of wooden blocks 20 having at least one end squared is positioned on two endless chains 21 with the squared end 22 abutting the side wall 23. Each conveyor chain 21 is endless and passes over an idler sprocket 25 at one end and a drive sprocket 24 at the other, the latter of which is driven through a friction clutch 26 by a variable speed motor 27. Dogs 28 spaced along the length of the chain 21 function in a manner to advance the wooden blocks 20 past a circular saw member 29 which severs the block to predetermined length so as to enable further passage with the chains between side walls 23 and 30.

A pair of horizontally disposed downwardly inclined disk members 31 having serrated or toothed edges 32 extend through a slot in the side wall members 23 and 30 beyond the idler sprocket 25 so as to compress and grip the ends of the block 20 therebetween as it is fed to them by the chain 21 and advance them toward a cutting drum 33. The disk members 31, rotated by a variable speed driving motor 34, take over the feed of the wooden block toward the cutting knives 35 peripherally arranged about the cutting drum 33.

With the feed wheels or disks 31 located immediately in advance of the cutting wheel 33 and in constant engagement with the wooden block while it is being cut and, with the downward slant of the disk, a steady feed rate of variable speed is secured without chatter or excessive vibration which would otherwise occur if the feeding of the block were performed by the dogs on the belt. The downward slant of the disks ensures that the block is kept firmly pressed against the bed plate 36, because the teeth in the disks thereby bite downwardly as well as inwardly, as the blocks are fed forward.

The cutting drum 33 is rotatably mounted on the shaft 36' which is adapted to be driven at variable speed from a power source (not shown). A plurality of knife elements 35 are substantially equidistantly arranged about the periphery of the wheel with the cutting edges extending from the surface thereof to effect severance of the block into wafers or slivers of the type which will hereinafter be described. By the proper selection and arrangement of knife elements, it has been found possible to sever wafers of predetermined contour in a single operation by the cutting drum 33 or else, if the knife elements are formed with flat edges of the type embodied in the cutting wheel of Figure 12, slivers of normal contour will be produced for a subsequent severance into shorter lengths having the desired end arrangements by additional cutting operations. When, as shown in Figure 10, the knife elements comprise a series of knife blades extending crosswise of the drum in spaced apart relation about the periphery thereof with the cutting edges Q in one blade having lengths corresponding to the length of the wafers to be cut with a substantially corresponding spaced relation therebetween and having tapered or inclined edges and the cutting elements P in alternate blades aligned to extend across the space between the cutting elements Q of the first blades and also having tapered or inclined edges, wafers are severed from the wooden block by the alternate blades engaging the surfaces of the wood uncut by the previous blade thereby alternately to engage sections of the wood uncut by the previous blades to sever wafers from the surface of the wooden block. Such wafers would have tapered ends of the type shown in Figure 6 of the drawings. When the knife elements, as shown in Figure 11, constitute a series of blades R having cutting edges Q of the type previously described in connection with Figure 10 as elements Q with alternate blades in between formed with a continuous cutting edge S extending across the drum, the cutting edges R sever wafers by movement across the grain of the block of wood wherein the wafers have tapered edges leaving ridges of woody material therebetween also having tapered edges which are removed to form cross-cut wafers by the following continuous blades S as the latter are advanced in engagement with the surface of the block of wood. Wafers of the type shown in Figure 7 having tapered ends will be produced. Wafers of the type shown in Figure 7 will also be produced by the alternate arrangement of knife elements T and U wherein the knife elements T are formed with V shape cutting elements extending outwardly therefrom in laterally spaced apart relation to gouge out wood from the surface of the block during movement crosswise of the grain to produce laterally spaced apart grooves in the face of the wooden block having edges inclined downwardly towards the center of the groove. When the block of wood is subsequently engaged by the knife blade U having a cutting edge extending continuously across the block of wood, wafers are severed having a thickness corresponding to the depth of cut, having a length corresponding to the distance between the grooves, and having ends which are tapered. In the latter construction, the portion gouged out by the projecting cutting elements in the knife T will constitute waste material.

The length of the wafers will correspond to the distance between the outwardly directed cutting edges or depressions in the knife elements while the width of the wafers will correspond to the thickness of the wooden block except for the splitting that normally occurs lengthwise along the grain which subdivides the wafer into widths usually an inch or less. The thickness of the wafer depends upon the linear rate of feed of the block as governed by the rotational movement of the disk members 31 and the peripheral speed of the cutting knives 35 which successively engage the block. Increasing the rate of feed of the block will correspondingly increase the thickness of the wafers produced while increasing the peripheral speed of the wheel will correspondingly reduce the thickness of the wafers and vice versa. For use in the manufacture of dense molded boards and panels, as will hereinafter be pointed out, it is desirable to control the thickness of the wafers to within the range of 0.002–0.015 inch. While best use is made of wafers having lengths and widths within the range of 0.5–2.0 inches, wafers of greater length or width may be produced but not to exceed 5 inches because this is probably the upper limit of size which will permit the wafers to be felted satisfactorily.

In Figures 12 and 13, the knife elements 35$^a$ are arranged crosswise of the drum 33 in substantially equidistantly spaced apart relation about the surface thereof. The blades are straight edged so that slivers 38 produced thereby are of substantially the length of the wooden blocks. The desired acute angularity of the end portions is achieved by feeding the cut slivers 38 lengthwise down an inclined chute 40 to an auxiliary cutting element in the form of a disk 41 which is adapted to be rotated by shaft 42. Projecting from the end wall of the disk 41 are a number of laterally disposed knife elements 43. The distance by which the knife elements project from the face of the disk 41 may be adjusted by endwise movement with respect thereto. The knife elements 43 cooperate with the bed knife 44 at the lower end of the chute 40 to sever the slivers 38 into wafers 45 and since the slivers are fed at an acute angle, preferably 45 degrees or less with the cutting disk 41, the cut end faces will have a correspondingly angular relationship with the broad faces. The disk 41 with its knife elements may be mounted obliquely with respect to the chute to provide more taper to the end faces. Instead of causing the slivers to feed downwardly in the chute by gravitational force, they may be positively conveyed by a belt or by the assistance of vibrational feeding elements or the like. The length of wafer will depend upon the rate of feed of the slivers 38 as well as the rotational speed of the cutting disk 41. However, as is preferable, the cutting speed is sufficiently slow to permit the leading edge of the sliver to engage the disk wall, so that the length of the wafers may be controlled by the distance which the cutting edges of the knives 43 project from the disk wall.

In a further modification, illustrated in Figure 14, a plurality of cutting knives 50 having substantially straight edges are arranged about the edge portions between a pair of spaced rotatable disk members 51 and 52 to form a cutting wheel assembly. The knife elements 50 cooperate with the bed knife at the base of a chute 53 to effect the desired severance of slivers 54 to desired length.

By arranging the axis of the cutting wheel at a predetermined angle with the oncoming slivers and by arranging the bottom of chute 53 at an angle to the plane which the cutting edges make with the bedplate, predetermined tapers in the sidewise as well as in the vertical direction may be achieved in the end face of the wafer. The length of wafer so produced depends upon the speed of the cutting wheel and the number of knives located therein as well as the rate of feed of the slivers to the cutting wheel.

Wafers or elements produced in accordance with this invention, exemplified in Figures 1 to 5, have wedge shaped ends formed by end faces ABHG or CDFE, a controlled thickness DJ, length AD and width DC, the end faces making an acute angle DAG or DEG with the top and bottom faces ABCD and HFEG. The end edges DC or AB may be made with any desired angle ADC to the side edges AD by providing the required angle RST in Figure 14 between the cutter and chute. The end faces DCFE and ABHG may be markedly curved if the edges of the sides of the depressions in the cutters shown in Figures 10, 11 and 11A are similarly curved.

In general, the side faces ADEG and BCFH will be neither flat nor exactly parallel to the length of the fibers because they will usually constitute fractured surfaces along natural striae as those between the annual rings in wood. However, either face may have been a part of the outer face of the billet of wood from which the wafer was cut. This absence of parallelism or regularity between the pairs of side faces of the majority of the wafers and the parallelism of each side face with the adjacent annual ring in the wood, serves in part to distinguish wafers made in accordance with this invention from others. For example, it is understood that thin decorative wafers have been sliced obliquely from the end of a stick of wood with the grain running the short way. In such a case, except for inadvertent fractures the end and side faces of the wafers so made will comprise parts of the four outer flat faces of the original stick of wood from which they were cut.

When the broad top and bottom surfaces of the wafers have been cut with a knife edge lying parallel to and moving across the direction of the fibers as herein described, the original strength of the fibrous elements in the woody structure is preserved almost intact. If, on the other hand, the cutting edge lies at an angle to or moves in other than a direction substantially perpendicular to the axial direction of the fibers, the resulting wafers, especially if cut from air dry wood, will be more or less checked or cracked across the grain, as is very evident with ordinary planer shavings. The direction in which the faces of fibers have been cut may be determined from microscopic observation, by seeing in which direction lie the scratches made by imperfections in the cutting edges and the direction in which microscopically small fibrous elements have bent while being cut.

Elements or wafers made in accordance with this invention, having a thickness of from 0.002 to 0.015 inch, from 1.0 to 2.0 inches long and of various widths, are particularly suitable for use in preparing a composite molded fibrous structure. This is preferably accomplished by dusting or mixing the wafers with a small percentage of finely powdered thermo-active resin, such as phenol formaldehyde, urea formaldehyde, melamine formaldehyde and the like curable thermosetting resins in an intermediate stage of polymeric growth, and felting the resulting resinous coated wafers into a mat, such as is described in my copending application Serial No. 110,212 filed August 13, 1949, now Patent No. 2,698,271. The desired resinous concentration in uniform distribution on the surfaces of the wafers can also be accomplished by treating the fibrous elements with resinous solution and dispersion and drying before felting or by the addition of such bonding agents in combination with the felting operation. When using dry powdered resin with wafers of the type described, it has been found that from 2-4 percent resin will produce molded boards having strength properties which are considerably greater than that heretofore secured with 10-40 percent by weight resin added to conventional fine wood fibers or to sawdust. The amount of resin required for molding into a composite board is dependent somewhat upon the thickness of wafers and the density of the wood of which they are formed, but with the thicker wafers more than 3 percent by weight resin is seldom if ever required. It is believed more accurate to define the resin concentration in relation to the amount present per unit area of fiber surface because of the variation in proportion to the thickness and the density of the wafer. Under such circumstance it has been found that amounts within the range of $1/10-1$ pound dry resin per 1000 square feet of surface area is sufficient for consolidation to produce boards which is only a small fraction of the amount required to produce a molded board of comparable strength with materials of the prior art. Further increases in the amount of resin are not necessary because it does not proportionately increase the strength of the molded product.

By way of example, wafers about 0.015 inch thick made in accordance with this invention from a moderately hard wood like Douglas Fir are dusted with 3 percent by weight of phenolic resin (minus 200 mesh) (about 0.52 pound per 1,000 square feet of surface area). The resinous coated wafers are felted into a mat and consolidated under pressure of 500 p. s. i. for 5 minutes at 320° F. A ¼ inch board having a density of 1.0 and a modulus of rupture of over 7000 p. s. i. is obtained. If a polished caul is used during the consolidation of molding of the board, the face of the board formed against it is characterized further by having a smooth, glossy surface unmarred by linear depressions at the ends of the wafers. The board is further characterized by substantially all of the visible wafers having their side edges parallel to the grain of the wood, as shown in the fibers in Figures 3 and 5 and by the fragmentary plan views of the boards in Figures 15 and 16.

If the knives cutting the wafers to length are dull, the end edges of the wafers will be ragged. This ragged or scalloped effect of the end edges is often achieved when the surface lamina of a structure composed of wafers having sharp straight end edges, is sanded. Removal of the surface by sanding, of course, removes also the resinous glossy surface.

Particularly when the wafers are cut from hard wood or wood having dense summer wood rings, wafers having ends tapered in thickness give a stronger and considerably smoother surfaced board than do wafers having blunt ends. Furthermore, this tapering of the ends permits a thicker wafer to be used than if the ends were not tapered. In consequence, the specific surface of the fibrous material is reduced and with this proportionately the quantity of resinous binder necessary to make a board having a required strength.

The use of a single cutting drum having knives of the type illustrated by Figures 10 and 11 provide fibers which are immediately cut to desired contour in a one step operation. However, the difficulty of maintaining the sharp cutting blades is much greater than with blades having straight cutting edges, illustrated by Figures 12-16. In the two step process which enables the use of straight edged knives, the knives can easily be kept sharp by the well known operation of "jointing." Moreover, with the two step process the length of the wafers can be more easily changed, if desired.

By permitting the knives on the sliver cutters to protrude only a little more from the face of the cutter than the thickness of the slivers to be cut, when the side end of a billet of wood is reached there is comparatively little disturbance to the cutting. By positively feeding the billets of wood to the cutter as close as possible to it as herein disclosed, not only is the thickness of unsupported side ends of the billets reduced to a minimum, but the absence of the springiness between the cutter and the feeding means of a comparatively long length of wood or pieces of wood, markedly improves the uniformity of thickness of the slivers and their smoothness of surface. Both these improvements result in an appreciable reduction in the quantity of resin and sizing necessary for making a structure of a required strength and resistance to liquids.

It is to be understood that the apparatus shown and described is to be taken as exemplary only of the method disclosed for producing an improved wafer of high quality and at a comparatively low cost from pieces of woody material that otherwise might be of little valve.

It will be further understood that numerous changes may be made in the details of construction, arrangement and operation of the apparatus without departing from the spirit of the invention, especially as defined in the following claims.

I claim:

1. A crosscut woody wafer adapted for use in a consolidated structure, said wafer having a thickness within the range of 0.002 to 0.015 inch in which the fibers are substantially parallel to and extend longitudinally of the wafer and having a length at least ten times the thickness of the wafer but less than 5 inches with the ends of the wafer at an acute angle with the broad faces.

2. A crosscut woody wafer adapted for use in a consolidated structure, said wafer having a thickness within the range of 0.002 to 0.015 inch and in which the fibers are subsequently parallel to and extend longitudinally of the wafer having its broad faces characterized by freedom of cracks and chips which are characteristic of wafers cut from woody material parallel to and along the fiber and having a length at least ten times the thickness of the wafer but less than 5 inches, and a thermosetting resinous material on the surfaces of the wafer in amounts ranging from 0.1 to 1 pound per 1,000 square feet of surface area.

3. A consolidated structure consisting essentially of a plurality of fibrous elements of the type claimed in claim 1 interfelted and aligned with the broad faces lying substantially in the same plane, and a thermosetting resinous binder integrating the wafers one to another into a composite structure.

4. Crosscut woody wafers adapted for use in a consolidated structure, said wafers having a thickness within the range of 0.002 to 0.015 inch and in which the fibers are substantially parallel to and extend longitudinally of the wafer having its broad faces characterized by freedom of cracks and chips which are characteristic of wafers cut from woody material parallel to and along the fiber and having a width at least twice the thickness and a length at least ten times the thickness of the wafer but less than 5 inches, and a thermosetting resinous material on the surfaces of the wafers in amounts ranging from 0.1 to 1 pound per 1,000 square feet of surface area.

5. A consolidated structure having a central lamina consisting essentially of a plurality of fibrous elements having a thickness within the range of 0.002 to 0.015 inch in which the fiber runs parallel to the broad faces and which has a length ranging from 0.5 to less than 5 inches, with the ends of the wafers at an acuate angle with the broad faces and with the fibrous elements interfelted and aligned with the broad faces lying substantially in the same plane, and a thermosetting resinous binder integrating the surfaces one to another to form the lamina and in which the resinous binder is present in amounts ranging from 0.1 to 1 pound per 1,000 square feet of surface area of the wafers present in the lamina.

6. A consolidated structure consisting essentially of a plurality of fibrous elements of the type claimed in claim 1 interfelted and aligned with the broad faces lying substantially in the same plane, and a thermosetting resinous binder integrating the wafers one to another into a composite hard molded board and present in amounts ranging from 0.1 to 1 pound per 1,000 square feet of surface area of the fibrous elements of which the board is formed.

7. The method of producing fibrous wafers of the type described including the combination of steps of cutting a block of wood parallel to the length of the fibers in the wood with a cutting movement transverse said length to form wafers having a thickness corresponding to the depth of cut and tapering the end walls of the wafers with respect to their thickness by slicing into the block of wood in advance of the cutting step with a slicing movement in the direction of cutting to form angular slots having a depth greater than the depth of cut and which define the angular end walls of the wafers that are formed.

8. The method of producing fibrous wafers of the type described including the combination of steps of cutting a block of wood parallel to the length of the fibers in the wood with a cutting movement transverse said length to form wafers having a thickness corresponding to the depth of cut and tapering the end walls of the wafers with respect to their thickness by cutting grooves having angular walls in longitudinally spaced apart relation in the block of wood with a cutting movement in the direction of cut and to a depth greater than the depth of waferizing cut to form wafers having ends tapering in thickness and lengths corresponding to the spaced relation between the angular walls of adjacent slots.

9. The method of producing fibrous wafers as claimed in claim 8 in which the length of the wafers is within the range of 0.5 to less than 5 inches.

10. A crosscut woody wafer as claimed in claim 2 in which the thermosetting resinous material is present in an amount not more than 4 percent by weight of the wafer.

11. A consolidated structure as claimed in claim 5 in which the amount of thermosetting resinous material is not more than 4 percent by weight of the lamina.

12. A lamina consisting essentially of a plurality of fibrous elements of the type claimed in claim 2 interfelted and aligned with the broad faces lying substantially in the same plane and a thermosetting resinous binder integrating the wafers one to the other in the lamina and present in an amount ranging from 0.1–1.0 pound per 1,000 square feet of surface area of the fibrous elements in the lamina but present in an amount not more than 4 percent by weight of the lamina.

References Cited in the file of this patent

UNITED STATES PATENTS

| | | |
|---|---|---|
| 783,946 | Gregory | Feb. 28, 1905 |
| 1,259,125 | Parker | Mar. 12, 1918 |
| 1,473,545 | Collier | Nov. 6, 1923 |
| 1,506,850 | Mange | Sept. 2, 1924 |
| 1,815,670 | Haworth | July 21, 1931 |
| 2,355,512 | Contratto | Aug. 8, 1944 |
| 2,392,844 | Fairchild | Jan. 15, 1946 |
| 2,509,642 | Horsak | May 30, 1950 |
| 2,549,251 | Skelton | Apr. 17, 1951 |
| 2,639,740 | Shafer | May 26, 1953 |
| 2,642,371 | Fahrni | June 16, 1953 |
| 2,689,092 | Clark et al. | Sept. 14, 1954 |

OTHER REFERENCES

"Paper Trade Journal," article by A. Elmendorf, published February 9, 1950 pages 29–31.

UNITED STATES PATENT OFFICE
Certificate

Patent No. 2,773,789                         Patented December 11, 1956

James d'A. Clark

Application having been made jointly by James d'A. Clark, the inventor named in the patent above identified; Consolidated Board Development Company, Chicago, Illinois, a corporation of Delaware, the assignee; and Arthur L. Mottet of Longview, Washington, for the issuance of a certificate under the provisions of Title 35, Section 256 of the United States Code, adding the name of the said Arthur L. Mottet to the patent as a joint inventor, and a showing and proof of facts satisfying the requirements of the said section having been submitted, it is this 5th day of December 1961, certified that the name of the said Arthur L. Mottet is hereby added to the said patent as a joint inventor with the said James d'A. Clark.

[SEAL]

EDWIN L. REYNOLDS,
*First Assistant Commissioner of Patents.*